United States Patent [19]

Takahashi et al.

[11] Patent Number: 5,174,425
[45] Date of Patent: Dec. 29, 1992

[54] STEERING ANGLE DETECTING DEVICE FOR A MOTOR VEHICLE

[75] Inventors: Akira Takahashi; Satoshi Takahashi; Junji Kojima; Kiyoharu Higashino, all of Gunma, Japan

[73] Assignees: Fuji Jukogyo Kabushiki Kaisha; NSK Ltd., both of Tokyo, Japan

[21] Appl. No.: 769,941

[22] Filed: Sep. 30, 1991

[30] Foreign Application Priority Data

Oct. 3, 1990 [JP] Japan .............................. 2-103619[U]

[51] Int. Cl.⁵ .............................................. F16D 67/00
[52] U.S. Cl. ........................... 192/66; 192/114 R; 180/79.1
[58] Field of Search ................ 73/1 E; 192/66, 89 R, 192/96, 114 R; 180/79.1

[56] References Cited

U.S. PATENT DOCUMENTS

| 2,126,760 | 8/1938 | Eason | 192/66 |
| 3,815,713 | 6/1974 | Dietrich | 192/114 R X |
| 4,212,379 | 7/1980 | Zoino | 192/66 |
| 4,441,572 | 4/1984 | Ito et al. | 180/79.1 X |
| 4,830,137 | 5/1989 | Tatemoto et al. | 180/79.1 |
| 5,065,324 | 11/1991 | Oshita et al. | 180/79.1 X |

FOREIGN PATENT DOCUMENTS 58-30818 2/1983 Japan .
62-163473 7/1987 Japan .

Primary Examiner—Leslie A. Braun
Assistant Examiner—Nicholas Whitelaw
Attorney, Agent, or Firm—Martin A. Farber

[57] ABSTRACT

A steering angle detecting device has an intermediate shaft comprising a first shaft and a second shaft, and a clutch provided between the first and second shafts for disengaging both the shafts from each other. A steering angle sensor is operated by a steering shaft through gears and the intermediate shaft. The clutch is disengaged and the steering angle sensor is set to a neutral position. The adjusted steering angle sensor is attached to a steering column and the input shaft is operatively connected to the steering shaft positioned at a neutral position thereof. Thereafter, the clutch is engaged, so that the input shaft of the sensor can be rotated by the steering shaft.

4 Claims, 4 Drawing Sheets

STEERING ANGLE DETECTING DEVICE FOR A MOTOR VEHICLE

BACKGROUND OF THE INVENTION

The present invention relates to a device for detecting a steering angle of a steering wheel of a motor vehicle.

Japanese Patent Application Laid-open 58-30818 and Japanese Utility Model Application Laid-open 62-163473 disclose steering angle detecting devices for motor vehicles.

In the conventional device, the rotation of a steering shaft is transmitted to an input shaft of a steering angle sensor through a gear train to rotate the input shaft in synchronism with the rotation of the steering shaft. The steering angle sensor produces an output signal in dependency on the rotating angle of the steering shaft, thereby detecting the steering angle of the steering wheel.

In order to produce an accurate steering angle signal, it is necessary to position the steering angle sensor at a neutral position thereof when the steering shaft is at a neutral position for straight-ahead driving.

However, it is difficult for the neutral position of the steering angle sensor to coincide with the neutral position of the steering shaft. Consequently, troublesome work is required for mounting the steering angle sensor on the steering shaft.

SUMMARY OF THE INVENTION

An object of the present invention is to provide a steering angle detecting device which can be accurately mounted on a steering shaft at a neutral position.

According to the present invention, there is provided a steering angle detecting device for a motor vehicle having a steering shaft rotatably mounted in a steering column, comprising, a case secured to the steering column, a first gear provided on the steering shaft coaxially therewith and exposed to an outside through an opening, an intermediate shaft means comprising a first shaft and a second shaft and rotatably mounted in the case in parallel with the steering shaft, a clutch provided between the first and second shafts for engaging and disengaging the first and second shafts, a second gear provided on the first shaft and engaged with the first gear, a third gear provided on the second shaft, a steering angle sensor having an input shaft and attached to the case, a fourth gear mounted on the input shaft of the steering angle sensor and engaged with the third gear, and clutch disengaging means for disengaging the clutch.

When attaching the steering angle detecting device to the steering column, the clutch is disengaged and the steering angle sensor is set to a neutral position. On the other hand, the steering shaft is positioned at the neutral position. The device with the adjusted steering angle sensor is attached to the steering column and the second gear on the first shaft is engaged with the first gear on the steering shaft positioned at the neutral position thereof. Thereafter, the clutch is engaged, so that the input shaft of the sensor can be rotated by the steering shaft through the first and second gears, intermediate shaft, and third and fourth gears.

In an aspect of the invention, the second shaft slidably and coaxially engages with the first shaft in the case. Also in an aspect of the invention the clutch comprises a conical hole formed in an end of the first shaft, a tapered portion formed on an end of the second shaft so as to be engaged with the conical hole, and a spring disposed between the second shaft and the case so as to urge the tapered portion to the conical hole.

In another aspect, the clutch disengaging means comprises a rod slidably inserted in an axial hole formed in the first shaft and abutted on the end of the second shaft so as to shift the second shaft to a clutch disengagement position, and holding means for resiliently holding the rod at the clutch disengaging position.

The other objects and features of this invention will become understood from the following description with reference to the accompanying drawings.

DETAILED DESCRIPTION OF THE PREFERRED EMBODIMENT

Figure 1:
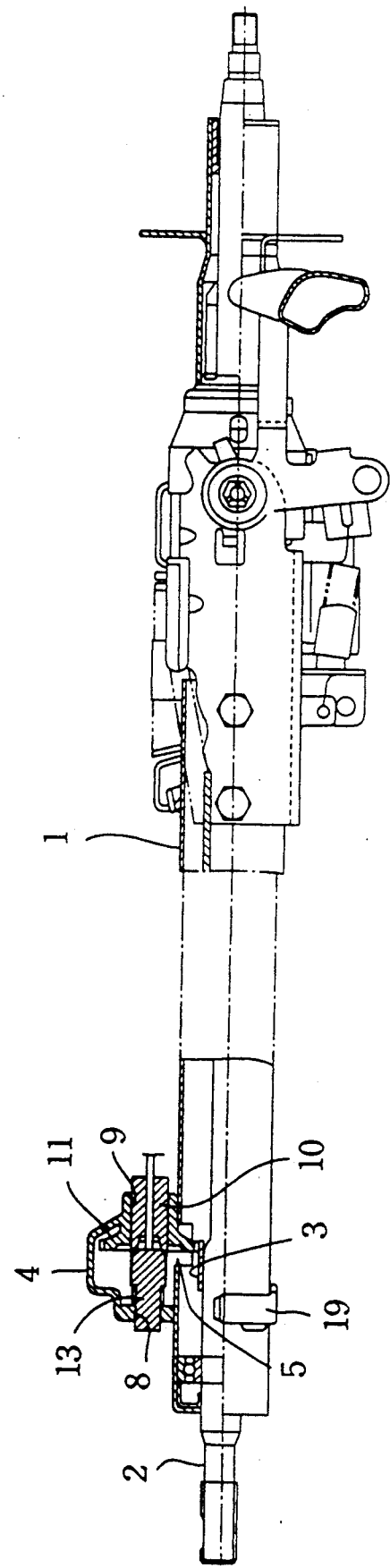
FIG. 1 is a sectional side view showing a part of a steering system for a motor vehicle having a steering angle detecting device according to the present invention.
Figure 2:
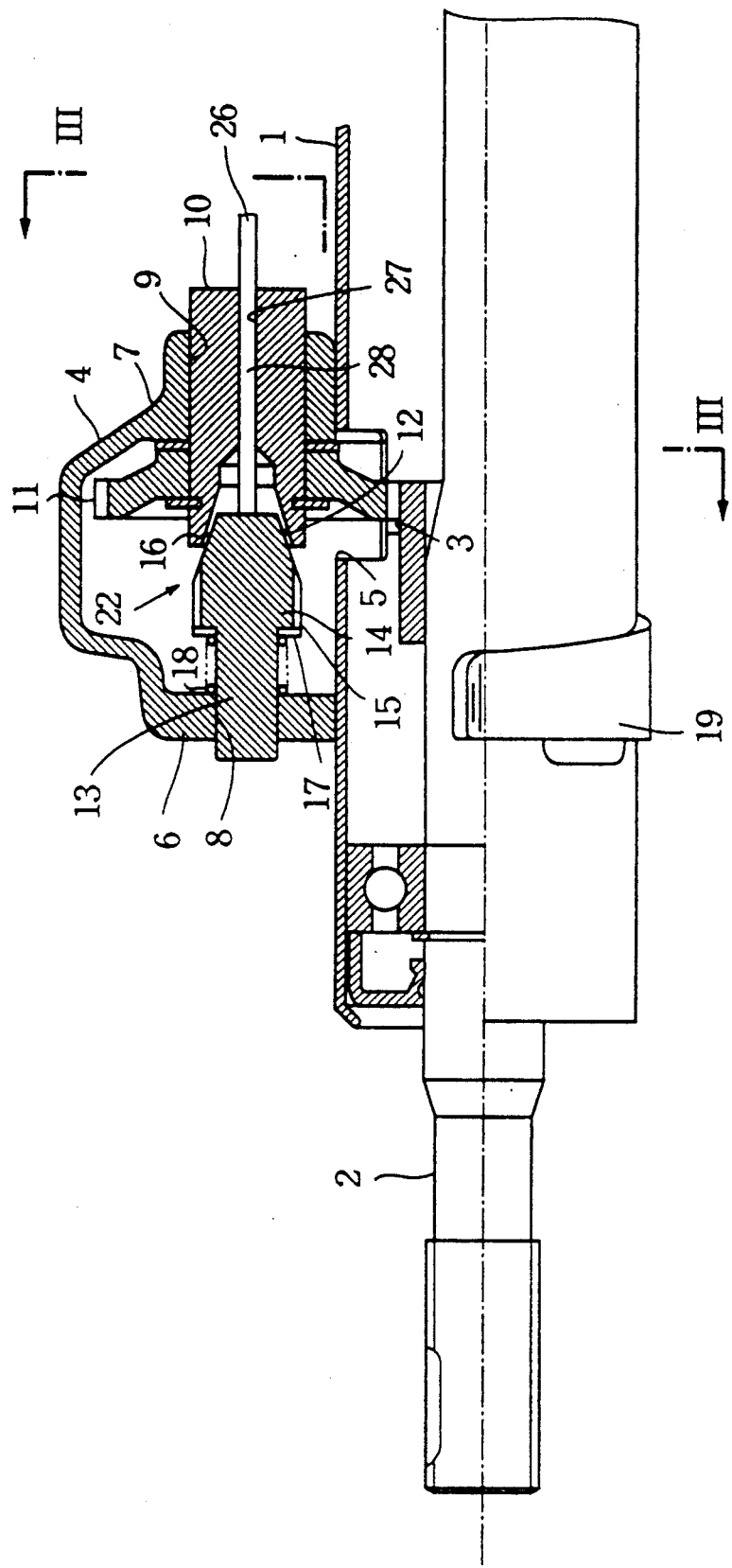
FIG. 2 is a sectional side view showing the steering angle detecting device.
Figure 3:
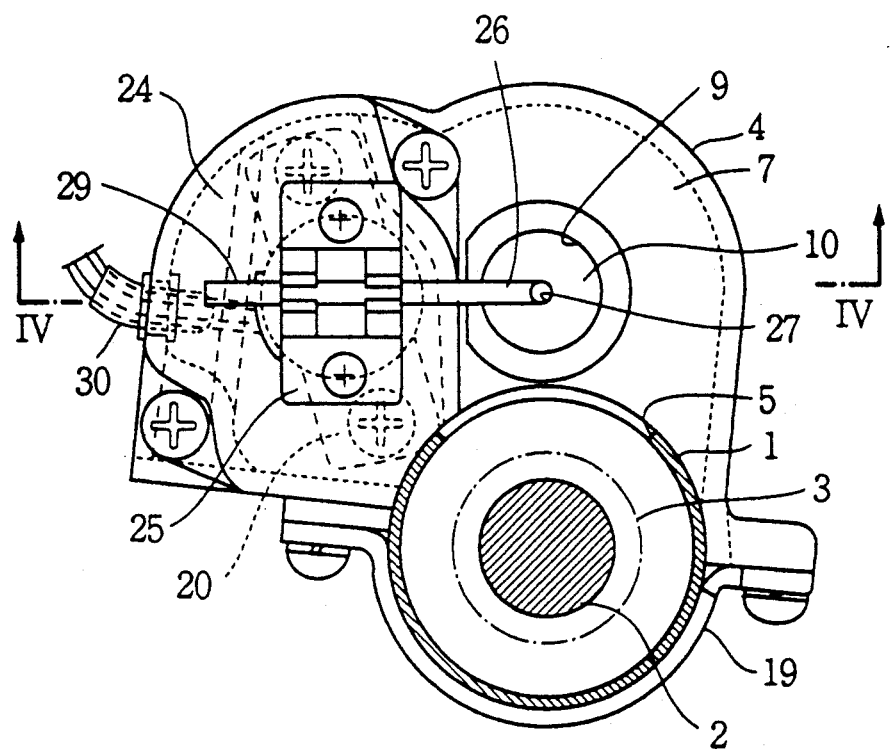
FIG. 3 is a sectional view of the device taken along a line III—III of FIG. 2.

Referring to FIGS. 1 and 2, a steering shaft 2 connected to a steering wheel (not shown) is rotatably mounted in a steering column 1. The steering column 1 has an opening 5 formed on an upper portion thereof, and an annular first gear 3 is securely mounted on the steering shaft 2, corresponding to the opening 5. A steering angle detecting device of the present invention is mounted on the steering column 1 at the opening 5.

The steering angle detecting device has a case 4 which is secured to the column 1 with a clamp 19 by screws. A hole 8 is formed on a front side portion 6 of the case 4 and a hole 9 is formed on a rear side portion 7. The holes 8 and 9 are coaxially formed with each other and parallel with the steering shaft 2. In the hole 9, a first shaft 10 is rotatably mounted. The first shaft 10 has a penetrating hole 27 axially formed through the shaft, and a conical hole 12 formed at the inner end thereof serving as a female member of a friction clutch 22. A second gear 11 is securely mounted on the first shaft 10 provided in the case 4 and engaged with the first gear 3. A second shaft 13 is slidably and rotatably mounted in the hole 8. The second shaft 13 has a large diameter inner portion 14 on which a third gear 15 is formed, and a tapered portion 16 formed on the innermost end thereof serving as a male member of the friction clutch 22. A spring 18 is provided between a shoulder 17 of the second shaft 13 and the inside wall of the front side portion 6 so that the second shaft 13 is urged to the first shaft 10 so as to engage the tapered portion with the hole 12 of the first shaft 10. Thus, the first shaft 10 and the second shaft 13 are connected with each other to compose an intermediate shaft. A sliding rod 26 is slidably inserted into the hole 27 of the first shaft 10, which will be described hereinafter.

Figure 4:
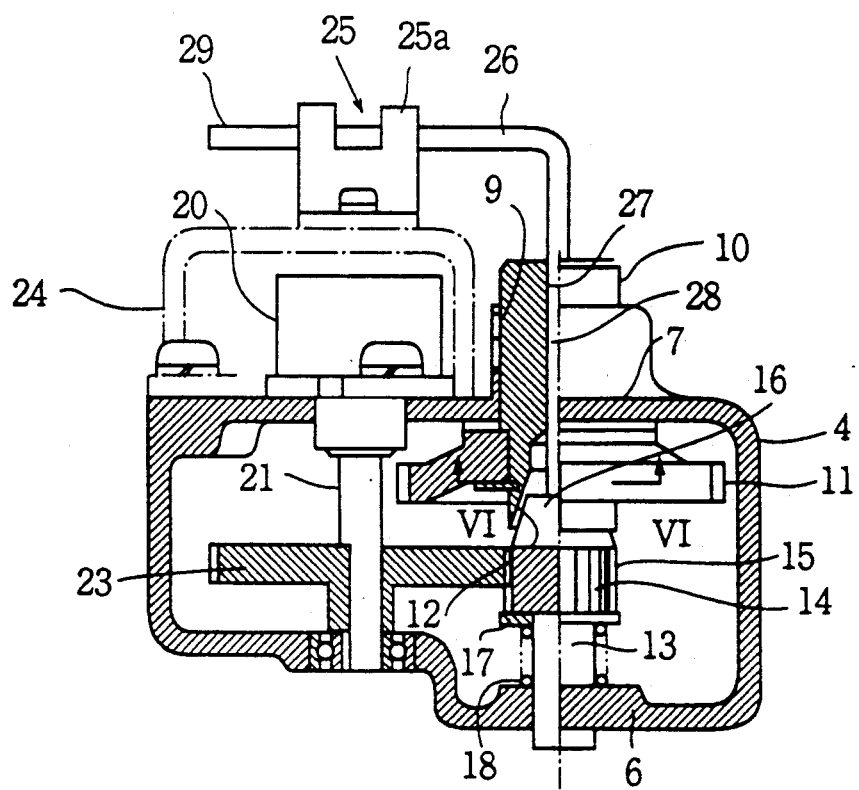
FIG. 4 is a sectional view of the device taken along a line IV—IV of FIG. 3 in a disengaging state of a clutch device.
Figure 5:
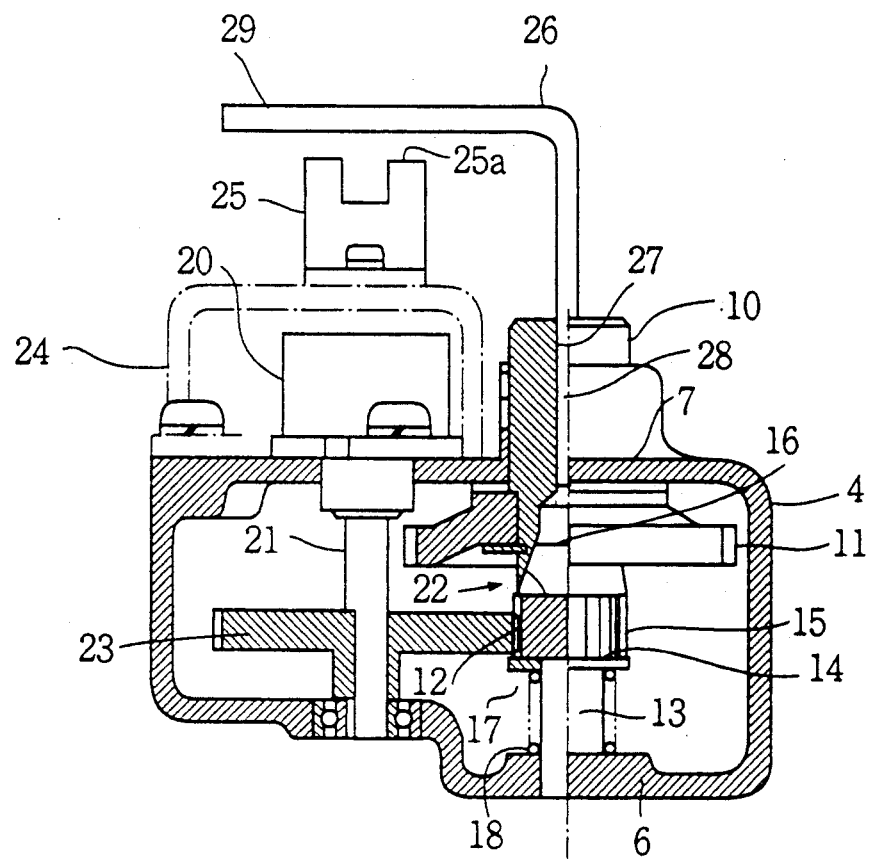
FIG. 5 is a sectional view of the device as is in FIG. 4 in an engaging state of the clutch device.
Figure 6:
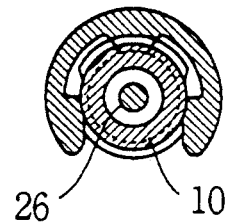
FIG. 6 is a sectional view of the device taken along a line VI—VI of FIG. 4.

Referring to FIGS. 3 to 6, a steering angle sensor 20 is mounted on the case 4. The sensor 20 has an input shaft 21 which extends into the case 4 in parallel with the intermediate shaft comprising shafts 10 and 13. An end of the input shaft 21 is rotatably mounted in the front side portion 6. The input shaft 21 is provided with a fourth gear 23 engaged with the third gear 15 of the second shaft 13. An auxiliary case 24 is provided for covering the sensor 20 and secured to the case 4 by screws. An engaging member 25 made of synthetic resin having elasticity is secured to the case 24 by screws. The engaging member 25 has a pair of gripping projections 25a for resiliently gripping the rod 26. Each gripping projection 25a comprises a pair of hooks. The sliding rod 26 inserted into the hole 27 is an L-shaped rod and has a slide portion 28 slidably inserted in the hole 27 and an engaging portion 29 detachably engaged with the engaging member 25. The rod 26 is provided to push the second shaft 13 to disengage the friction clutch 22 between the shafts 10 and 13 when it is engaged with the engaging member 25, as shown in FIG. 4.

Bearings and washers are provided around the rotating members of the device for reducing the friction thereof, thereby allowing the rotating members to be easily rotated with little force.

The steering angle detecting device is independently assembled. Before the device is attached on the column 1, the sensor 20 is set to a neutral position.

In order to set the sensor 20 at the neutral position, a screwdriver is engaged with a groove formed on a flat end of the input shaft 21 exposing on the front side portion 6, and operated to rotate the input shaft 21 to the neutral position of the sensor 20. Thereafter, the clutch 22 is disengaged, and the steering angle detecting device is attached to the steering column 1.

In order to disengage the clutch 22, the slide portion 28 of the rod 26 is inserted into the hole 27 of the first shaft 10 to push the flat end of the second shaft 13 outwardly. Thus, the clutch 22 is disengaged against the spring 18, while the engaging portion 29 of the rod 26 engages with the gripping projections 25a of the engaging member 25 as shown in FIG. 4. Thus, the position of the rod 26 is held to maintain the sensor 20 in the neutral position.

The slide portion 28 is determined to have a length sufficient enough to engage the engaging portion 29 with the gripping projections 25a of the engaging member 25 when the shaft 13 is outwardly pushed by the portion 28 against the spring 18.

Thereafter, the detecting device is mounted on the steering column 1 and the case 4 is secured to the column 1 with the clamp 19, while the second gear 11 is engaged with the first gear 3. Then, the steering shaft 2 is positioned in the neutral position. The engaging portion 29 of the rod 26 is pulled out of the engaging member 25, so that the second shaft 13 is moved inwardly by the spring 18 to engage the clutch 22.

Thus, the steering shaft 2 in the neutral position is mechanically connected to the steering angle sensor 20 positioned in the neutral position through the first and second gears 3 and 11, the first shaft 10, the second shaft 13, the third gear 15, the fourth gear 23 and the input shaft 21.

The operation of the device is as follows. When the steering shaft 2 is rotated, the second gear 11 is rotated through the first gear 3 to rotate the first shaft 10. Since the clutch 22 is engaged, the second shaft 13 is rotated to rotate the third gear 15 which rotates the fourth gear 23. Thus, the input shaft 21 of the steering angle sensor 20 is rotated an angle corresponding to the steering angle of the steering shaft 2. The sensor 20 produces a steering angle signal through a lead wire 30 which is connected to an electric system.

In accordance with the present invention, the steering angle sensor and the steering shaft can be easily adjusted in respective neutral positions, thereby improving the assembling workability.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A steering angle detecting device for a motor vehicle having a steering shaft rotatably mounted in a steering column, comprising:

a case secured to said steering column;

a first gear provided on said steering shaft coaxially therewith and exposed to an outside through an opening;

an intermediate shaft means comprising a first shaft and a second shaft and rotatably mounted in the case in parallel with said steering shaft;

a clutch provided between said first and second shafts for engaging and disengaging said first and second shafts;

a second gear provided on said first shaft and engaged with said first gear;

a third gear on said second shaft;

a steering angle sensor having an input shaft and attached to the case;

a fourth gear mounted on said input shaft of the steering angle sensor and engaged with the third gear; and clutch disengaging means for disengaging said clutch.

2. The steering angle detecting device according to claim 1, wherein
said second shaft slidably and coaxially engages with said first shaft in said case.

3. The steering angle detecting device according to claim 4, wherein
said clutch disengaging means comprises a rod slidably inserted in an axial hole formed in the first shaft and abutted on the end of the second shaft so as to shift the second shaft to a clutch disengagement position, and holding means for resiliently holding said rod at the clutch disengaging position.

4. The steering angle detecting device according to claim 2, wherein
said clutch comprises a conical hole formed in an end of said first shaft, a tapered portion formed on an end of said second shaft so as to be engaged with the conical hole, and a spring disposed between the second shaft and the case so as to urge the tapered portion to the conical hole.

* * * * *